US008914282B2

(12) United States Patent
Konchitsky

(10) Patent No.: US 8,914,282 B2
(45) Date of Patent: *Dec. 16, 2014

(54) WIND NOISE REDUCTION

(76) Inventor: Alon Konchitsky, Sunnyvale, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 13/585,138

(22) Filed: Aug. 14, 2012

(65) Prior Publication Data

US 2012/0310639 A1 Dec. 6, 2012

Related U.S. Application Data

(63) Continuation-in-part of application No. 12/567,787, filed on Sep. 27, 2009.

(60) Provisional application No. 61/101,260, filed on Sep. 30, 2008.

(51) Int. Cl.

| | |
|---|---|
| ***G10L 21/00*** | (2013.01) |
| ***G10L 21/02*** | (2013.01) |
| ***G10L 19/00*** | (2013.01) |
| ***G10L 15/00*** | (2013.01) |
| ***G10L 15/20*** | (2006.01) |
| ***G10L 21/0208*** | (2013.01) |

(52) U.S. Cl.

CPC .................................. *G10L 21/0208* (2013.01)

USPC ........... 704/226; 704/220; 704/225; 704/228; 704/233

(58) Field of Classification Search

USPC .......................... 704/220, 225, 226, 228, 233

See application file for complete search history.

(56) References Cited

U.S. PATENT DOCUMENTS

| | | | | |
|---|---|---|---|---|
| 5,012,519 | A * | 4/1991 | Adlersberg et al. | 704/226 |
| 5,288,955 | A | 2/1994 | Staple et al. | |
| 6,604,071 | B1 * | 8/2003 | Cox et al. | 704/225 |
| 7,174,023 | B2 | 2/2007 | Ozawa | |
| 8,284,947 | B2 * | 10/2012 | Giesbrecht et al. | 381/66 |
| 8,600,073 | B2 * | 12/2013 | Sun | 381/94.3 |
| 2002/0029141 | A1 * | 3/2002 | Cox et al. | 704/220 |
| 2002/0037088 | A1 | 3/2002 | Dickel | |
| 2004/0049383 | A1 * | 3/2004 | Kato et al. | 704/226 |
| 2004/0196891 | A1 * | 10/2004 | Tapaninen | 375/148 |
| 2005/0027520 | A1 * | 2/2005 | Mattila et al. | 704/228 |
| 2006/0078141 | A1 | 4/2006 | Jessen | |
| 2006/0120540 | A1 | 6/2006 | Luo | |
| 2006/0206320 | A1 * | 9/2006 | Li | 704/226 |
| 2006/0271362 | A1 * | 11/2006 | Katou et al. | 704/233 |
| 2007/0003090 | A1 | 1/2007 | Anderson | |
| 2007/0030989 | A1 * | 2/2007 | Kates | 381/317 |
| 2007/0237271 | A1 * | 10/2007 | Pessoa et al. | 375/346 |
| 2008/0167866 | A1 * | 7/2008 | Hetherington et al. | 704/228 |
| 2009/0112584 | A1 * | 4/2009 | Li et al. | 704/233 |
| 2010/0023327 | A1 * | 1/2010 | Jung et al. | 704/225 |

OTHER PUBLICATIONS

Boll, "Suppression of Acoustic Noise in Speech Using Spectral Subtraction", 1979, IEEE Transactions on Acoustics, Speech and Signal Processing, vol. 2, pp. 113-120.*

* cited by examiner

*Primary Examiner* — Richemond Dorvil
*Assistant Examiner* — Olujimi Adesanya
(74) *Attorney, Agent, or Firm* — Steven A. Nielsen; Allman & Nielsen, P.C.

(57) ABSTRACT

By monitoring the wind noise in a location in which a cellular telephone is operating and by applying noise reduction and/or cancellation protocols at the appropriate time via analog and/or digital signal processing, it is possible to significantly reduce wind noise entering into a communication system.

2 Claims, 9 Drawing Sheets

WIND NOISE REDUCTION

RELATED PATENT APPLICATION AND INCORPORATION BY REFERENCE

This is a continuation in part or CIP utility application based pending U.S. patent application Ser. No. 12/567,787 filed on Sep. 27, 2012 which in turn is based upon U.S. patent application Ser. No. 61/101,260 entitled "Method of Wind Noise Reduction" filed on Sep. 30, 2008. The related applications are incorporated herein by reference and made a part of this application. If any conflict arises between the disclosure of the invention in this utility application and that in the related applications, the disclosure in this utility application shall govern. Moreover, the inventor (s) incorporate herein by reference any and all patents, patent applications, and other documents hard copy or electronic, cited or referred to in this application and/or any related application.

BACKGROUND OF THE INVENTION (1) Field of the Invention

The present invention relates to means and methods of providing clear, high quality voice with a high signal-to-noise ratio, in voice communication systems, devices, telephones, and methods, and more specifically, to systems, devices, and methods that automate control in order to correct for variable environment noise levels and reduce or cancel the environment noise prior to sending the voice communication over cellular telephone communication links.

This invention is the field of processing signals in cell phones, Bluetooth headsets etc. In general, it more relates to any device which is operated in windy environments.

(2) Description of the Related Art

Communication devices are used in different environments and are subjected to different environmental noises, in particular wind noise. Wind noise is highly non-stationary. Its power and spectral characteristics vary greatly. For applications like professional recordings, news broadcast etc., it is possible to mitigate the effects of wind noise using high quality microphones coupled with wind screens (Metal or foam based). However, these solutions cannot be directly applied to mobile devices (cell phones, Bluetooth headsets). To cope with this problem we can process the signal in a Digital Signal Processor. The noisy signal is picked up by the microphone, digitized by an Analog to Digital Converter and fed to the processor for analysis and noise reduction.

Most of noise reduction algorithms are based on the assumption that the interfering noise is stationary (HVAC, projector noise) or slowly varying compared with speech (car noise, street noise). This assumption allows "learning" the characteristics of the noise between speech pauses and, based on a noise estimate, to build different filters that reduce the noise. In the case of wind noise this basic assumption is not valid. Wind noise is highly non-stationary, its power and spectral characteristics vary greatly. Because of its high non-stationary, regular noise reduction algorithms cannot be used to reduce wind noise. For reducing wind noise effects in a device, the signal has to be processed in a number of frequency bins.

Voice communication devices such as cell phones, wireless phones and devices other than cell phones have become ubiquitous; they show up in almost every environment. These systems and devices and their associated communication methods are referred to by a variety of names, such as but not limited to, cellular telephones, cell phones, mobile phones, wireless telephones in the home and the office, and devices such as Personal Data Assistants (PDA's) that include a wireless or cellular telephone communication capability. They are used at home, office, inside a car, a train, at the airport, beach, restaurants and bars, on the street, and almost any other venue. As might be expected, these diverse environments have relatively higher and lower levels of background, ambient, or environmental noise. For example, there is generally less noise in a quiet home than there is in a crowded bar. If this noise, at sufficient levels, is picked up by the microphone, the intended voice communication degrades and though possibly not known to the users of the communication device, uses up more bandwidth or network capacity than is necessary, especially during non-speech segments in a two-way conversation when a user is not speaking.

A cellular network is a radio network made up of a number of radio cells (or just cells) each served by a fixed transmitter, normally known as a base station. These cells cover different geographical areas in order to provide coverage over a wider geographical area than the area of one cell. Cellular networks are inherently asymmetric with a set of fixed main transceivers each serving a cell and a set of distributed (generally, but not always, mobile) transceivers which provide services to the network's users.

The primary requirement for a cellular network is that each of the distributed stations needs to distinguish signals from their own transmitter and signals from other transmitters. There are two common solutions to this requirement: Frequency Division Multiple Access (FDMA) and Code Division Multiple Access (CDMA). FDMA works by using a different frequency for each neighboring cell. By tuning to the frequency of a chosen cell, the distributed stations can avoid the signals from other neighbors. The principle of CDMA is more complex, but achieves the same result; the distributed transceivers can select one cell and listen to it. Other available methods of multiplexing such as Polarization Division Multiple Access (PDMA) and Time Division Multiple Access (TDMA) cannot be used to separate signals from one cell to the other since the effects of both vary with position, which makes signal separation practically impossible. Orthogonal Frequency Division Multiplexing (OFDM), in principle, consists of frequencies orthogonal to each other. TDMA, however, is used in combination with either FDMA or CDMA in a number of systems to give multiple channels within the coverage area of a single cell.

The wireless world comprises the following exemplary, but not limited to the communication schemes: time based and code based. In the cellular mobile environment these techniques are named as TDMA (Time Division Multiple Access) which comprises, but not limited to the following standards GSM, GPRS, EDGE, IS-136, PDC, and the like; and CDMA (Code Division Multiple Access) which comprises, but not limited to the following standards: CDMA One, IS-95A, IS-95B, CDMA 2000, CDMA 1×EvDv, CDMA 1×EvDo, WCDMA, UMTS, TD-CDMA, TDS-DMA, OFDM, WiMax, WiFi, and others).

For the code division based standards or the orthogonal frequency division, as the number of subscribers grow and average minutes per month increase, more and more mobile calls typically originate and terminate in noisy environments. The background or ambient noise degrades the voice quality.

For the time based schemes, like GSM, GPRS and EDGE schemes, improving the end-users signal-to-noise ratio (SNR), improves the listening experience for users of existing TDMA based networks. This is done by improving the received speech quality by employing background noise reduction or cancellation at the sending or transmitting device.

Significantly, in an on-going cell phone call or other communication from an environment having relatively higher environmental noise, it is sometimes difficult for the party at the other end of the conversation to hear what the party in the noisy environment is saying. That is, the ambient or environmental noise in the environment often “drowns out” the cell phone user’s voice, whereby the other party cannot hear what is being said or even if they can hear it with sufficient volume the voice or speech is not understandable. This problem may even exist in spite of the conversation using a high data rate on the communication network.

The term “wind noise” is used to describe several different ways that wind can be generated. For example, wind can cause a loose shutter to bang against a house or it can cause a flag to rustle and snap. In these cases, the wind has caused an object to move, and the motion makes a sound. In other cases, wind moving past an object can create a howling sound, even though the object does not vibrate. Here, the sound is caused by turbulence that is created in the moving air as it passes by the object. This turbulence, which cannot be seen, is very similar to the turbulence in a fast-moving stream as the water flows around and over large rocks. We have all experienced this kind of wind noise while inside a house during a windstorm. The sound of the howling wind originates in the turbulence of air motion past the walls and roof.

The form of wind noise that most interferes with our ability to hear and communicate is the noise generated by air flow around our own head. Here the sound is generated within centimeters of our ears, and may be heard at quite a high level because of this close proximity.

It is known art to reduce wind noise by mechanical means. Such means alone, however, do not eliminate the wind noise to a satisfactory level.

Therefore, wind noise has been studied extensively and many solutions have been proposed for hearing aids, Bluetooth headsets and similar devices.

Current wind noise reduction solutions use high-pass filters or subtract an estimate of the wind noise from the noisy signal. An efficient wind noise reduction can be achieved only if can be detected reliably and consistently.

Wind noise exhibits some properties and features that are common to other types of noise encountered in our daily lives. Depending on the wind speed, direction, physical obstructions like hats, caps, hand etc the characteristics of wind noise vary greatly. For these reasons, it is difficult to detect the presence of wind noise and cancel it when compared to other environmental noises.

However, certain factors make wind noise unique. Wind noise predominantly is a low-frequency phenomenon. Many of the known art technologies detect wind noise using the property of low correlation of the wind noise.

It is known art to reduce wind noise by mechanical means such as foam, scrims etc. To be sufficiently effective, the mechanical means must be thick which might make the device look bulky. This can be undesirable.

Several attempts to detect wind noise are known in the related art. US patent US2002/037088, assigned to Dickel et al, detects wind noise by computing the correlation between signals received at the two microphones. Turbulence created at the two microphones, without any obstructions, causes signals with low correlation. However, our studies showed that obstructions in the vicinity of the microphone result the correlation to be high.

European patent EP 1 339 256 A2, assigned to Roeck et al, uses several of the well know wind noise properties like high energy content at low frequencies, low auto-correlation at two microphones and high-magnitudes. However, this approach also suffers from the same drawbacks discussed above.

European patent application EP 1 732 352 A1, assigned to Hetherington et al, uses multiple microphones where power levels in different microphones are compared. When the power level of the sound received at the second microphone is less than the power level of the sound received at the first microphone by a predefined value, wind noise may be present. However, this approach requires one of the microphones to be directional with high directivity index and the other microphone to be Omni-directional with low directivity index.

U.S. Pat. No. 7,174,023 granted to Ozawa uses a multi-microphone approach. This approach uses passing the “difference signals” from multiple microphones through a low pass filter to extract wind noise for analysis and synthesis. However, our studies and recordings of wind noise under conditions show that wind noise is sometimes concentrated in higher frequency regions as well.

U.S. Pat. No. 5,288,955 granted to Staple et al talks about an arrangement in a bullet-shaped housing having a rounded front portion. However, this is a hardware approach.

US patent 2007/0003090 granted to Anderson talks about using a mesh made with either nylon or metal having a single or plurality of layers. This also is a hardware approach.

US patent US 2006/012540 A1 granted to Luo uses one microphone and two microphones. The patent talks about hearing aids but it does not cover Bluetooth headsets and cell phones, where the introduction of the second microphone could sometimes be difficult.

Hence there is a need in the art for a method of noise reduction or cancellation that is robust, suitable for mobile use, and inexpensive to manufacture. The increased traffic in cellular telephone based communication systems has created a need in the art for means to provide a clear, high quality signal with a high signal-to-noise ratio.

It is an objective of the present invention to provide methods and devices that overcome disadvantages of prior art wind noise detection and reduction.

The requirements of a wind noise reduction system for speech enhancement are a) Intelligibility, naturalness of the enhanced signal, b) Improvement of the signal-to-noise ratio, c) Short signal delay and d) Computational simplicity There are several methods for performing noise reduction, but all can be categorized as types of filtering. In the related art, speech and noise are mixed into one signal channel, where they reside in the same frequency band and may have similar correlation properties. Consequently, filtering will inevitably have an effect on both the speech signal and the background noise signal. Distinguishing between voice and background noise signals is a challenging task. Speech components may be perceived as noise components and may be suppressed or filtered along with the noise components.

It is an objective of the present invention to provide methods and devices that overcome disadvantages of prior art wind noise detection and reduction schemes. The methods should be computationally inexpensive, ability to detect and reduce low, medium and high levels of wind noise.

SUMMARY OF THE INVENTION

The present invention provides a novel system and method for monitoring the wind noise in the environment in which a cellular telephone is operating and cancels it before it is transmitted to the other party so that the party at the other end of the voice communication link can more easily hear what the cellular telephone user is transmitting.

The present invention preferably employs noise reduction and or cancellation technology that is operable to attenuate or even eliminate pre-selected portions of an audio spectrum. By monitoring the wind noise in a location in which the cellular telephone is operating and applying noise reduction and/or cancellation protocols at the appropriate time via analog and/or digital signal processing, it is possible to significantly reduce wind noise to which a party to a cellular telephone call might be subjected.

In one aspect of the invention, the invention provides a system and method that enhances the convenience of using a cellular telephone or other wireless telephone or communications device, even in a location having relatively high amounts of wind noise.

In another aspect of the invention, the invention provides a system and method for canceling wind noise before it is transmitted to another party.

In yet another aspect of the invention, the invention monitors wind noise via a microphone and thereafter cancels the monitored wind noise.

In still another aspect of the invention, an enable/disable switch is provided on a cellular telephone device to enable/disable wind noise reduction.

These and other aspects of the present invention will become apparent upon reading the following detailed description in conjunction with the associated drawings. The present invention overcomes shortfalls in the related art with an adaptive wind noise cancellation algorithm. These modifications, other aspects and advantages will be made apparent when considering the following detailed descriptions taken in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

The present invention provides a novel and unique background noise or environmental noise reduction and/or cancellation feature for a communication device such as a cellular telephone, wireless telephone, cordless telephone, recording device, a handset, and other communications and/or recording devices. While the present invention has applicability to at least these types of communications devices, the principles of the present invention are particularly applicable to all types of communication devices, as well as other devices that process or record speech in noisy environments such as voice recorders, dictation systems, voice command and control systems, and the like. For simplicity, the following description employs the term "telephone" or "cellular telephone" as an umbrella term to describe the embodiments of the present invention, but those skilled in the art will appreciate the fact that the use of such "term" is not considered limiting to the scope of the invention, which is set forth by the claims appearing at the end of this description.

Hereinafter, preferred embodiments of the invention will be described in detail in reference to the accompanying drawings. It should be understood that like reference numbers are used to indicate like elements even in different drawings. Detailed descriptions of known functions and configurations that may unnecessarily obscure the aspect of the invention have been omitted.

Let a windowed speech signal and noise signal be represented by s(k) and n(k) respectively. The sum of the two is then denoted by x(k), $$x(k)=s(k)+n(k) \tag{1}$$

Taking the Fast Fourier Transform (FFT) of both sides of equation (1) gives $$X(e^{jw}) = S(e^{jw}) + N(e^{jw}) \tag{2}$$

Where $$x(k) \overset{FFT}{\longleftrightarrow} X(e^{jw}) \tag{3}$$

Figure 1:
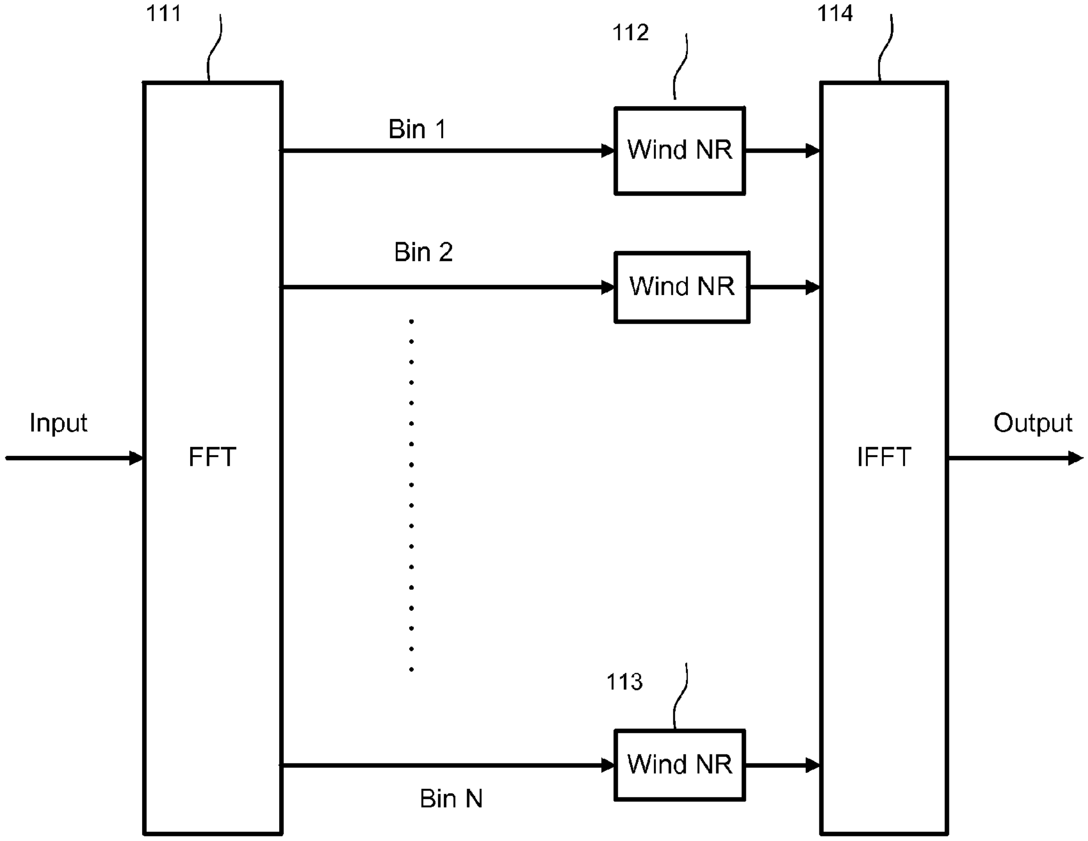
FIG. 1 is diagram of an exemplary embodiment of the wind noise reduction scheme as discussed in the current invention.

In FIG. 1, block 111 is the FFT of the input signal. 112 and 113 are the blocks which do the wind noise reduction. 114 is the IFFT of the signal which is the desired output.

Figure 2:
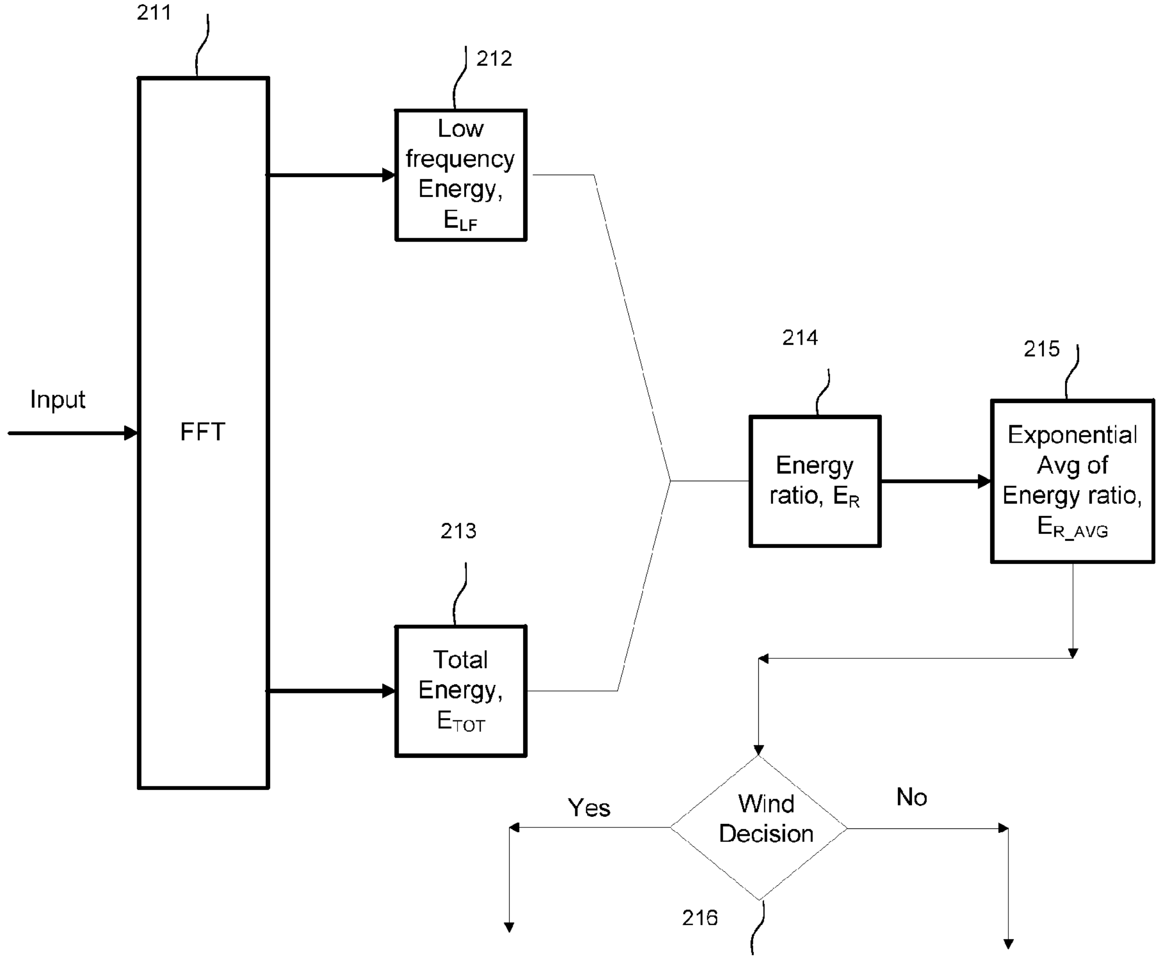
FIG. 2 is a diagram of an exemplary embodiment of the system which finds the ratio between low frequency energy and total energy and then makes a decision if the incoming signal is wind or not.

In FIG. 2, block 211 is the FFT of the input signal. 212 is the low frequency energy of the input noisy signal, $E_{LF}$. Block 213 is the Total energy of the input signal, $E_{TOT}$. 214 is the ratio of energies calculated at block 212 and 213 respectively and is called $E_R$. Block 215 exponentially averages the energy ratio, $E_{R\_AVG}$.

$$E_{R\_AVG}=\alpha(E_{R\_AVG})+(1-\alpha)E_R \tag{4}$$

The value of α can be chosen to be in the range 0.75 to 0.95.

If the energy ratio average is greater than a particular threshold the wind decider makes a decision of 1. Otherwise the decision is 0. This threshold is chosen to be in the range of 0.30 to 0.40.

Figure 3:
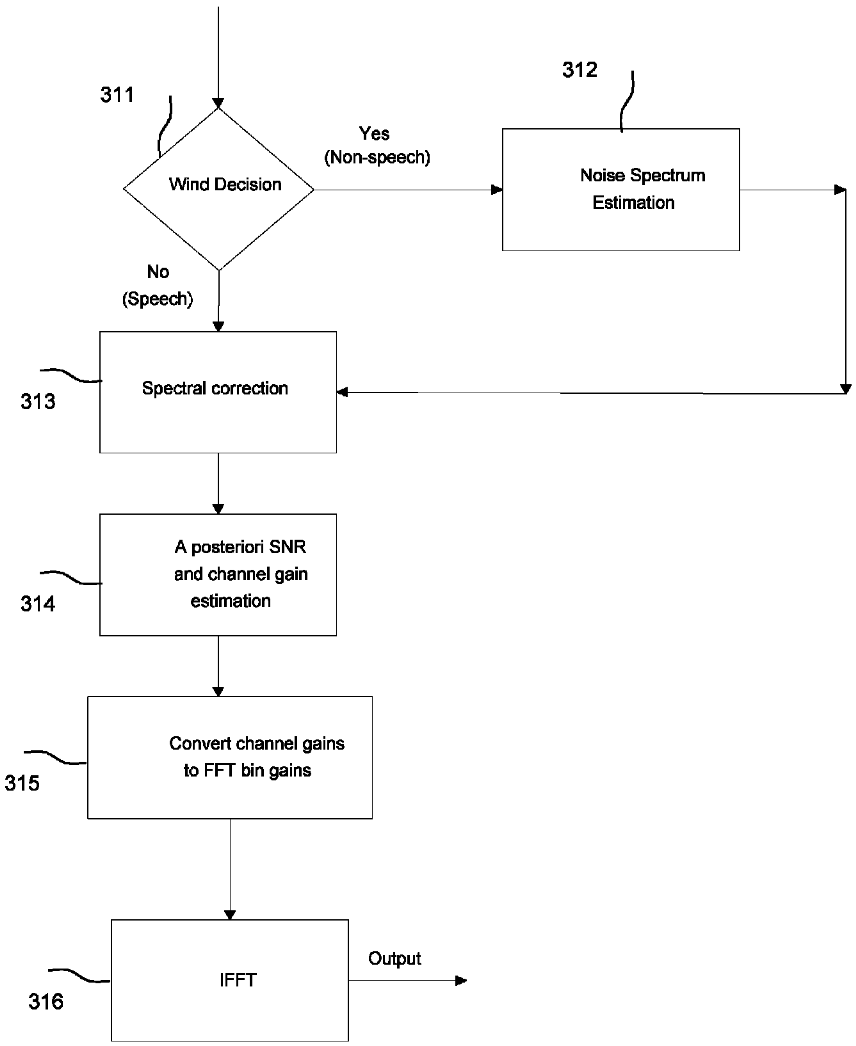
FIG. 3 is a diagram of an exemplary embodiment of the system which takes the decision and does the spectral correction to reduce the overall effect of wind noise.

In FIG. 3, block 311 decides if the incoming frame of signal is wind or not. If the decision is made as wind, block 312 estimates the energy of that particular frame and averages it with the previous frames classified as noise. Again, the average equation (4) is used with similar range of values for α.

Taking equation (2) into account, the noise spectrum is generally averaged for the conversation, so that the listener is not affected by varying noise levels. To obtain the estimate of the noise spectrum the magnitude |N(ejω)| of N(ejω) is replaced by its average value $\mu(e^{j\omega})$ taken during the regions estimated as "noise only".

$$\mu(e^{jw})=E\{|N(e^{j\omega})|\} \quad (5)$$

The power spectral density of the signal is calculated by subtracting the current noise estimator (eq 5) from the noisy observation as:

$$\hat{S}(e^{jw})=X(e^{jw})-\mu(e^{jw}) \quad (6)$$

Where $\mu(e^{jw})$ is the average value of the noise spectrum (eq 5). Due to random variations of noise, spectral subtraction can result in negative estimates of the short-time magnitude or power spectrum. The magnitude and power spectrum are non-negative variables, and any negative estimates of these variables should be mapped into non-negative values.

Equations (5) and (6) are used to calculate the SNR per channel in block 314. The gains are linear estimators based on the SNR per band. The gain estimations are given by:

$$\text{gain[band]}=K{*}a\text{\_priori\_SNR[band]}+\text{LIMITER} \quad (7)$$

Where "K" and "LIMITER" are constants obtained by maximizing the SNRI (Signal to Noise Ratio Improvement) over a Data Base of different speakers and noises. The LIMITER value controls the amount of noise left versus speech distortion level.

Another approach used in the present invention is to find the gains per bin.

After the gains are calculated, they are expanded (duplicated) to cover all the FFT bins. These FFT gains are multiplied with the N FFT bins of the noisy signal to get the corrected spectrum in block 315. N can be 256 or 512.

Figure 4A:
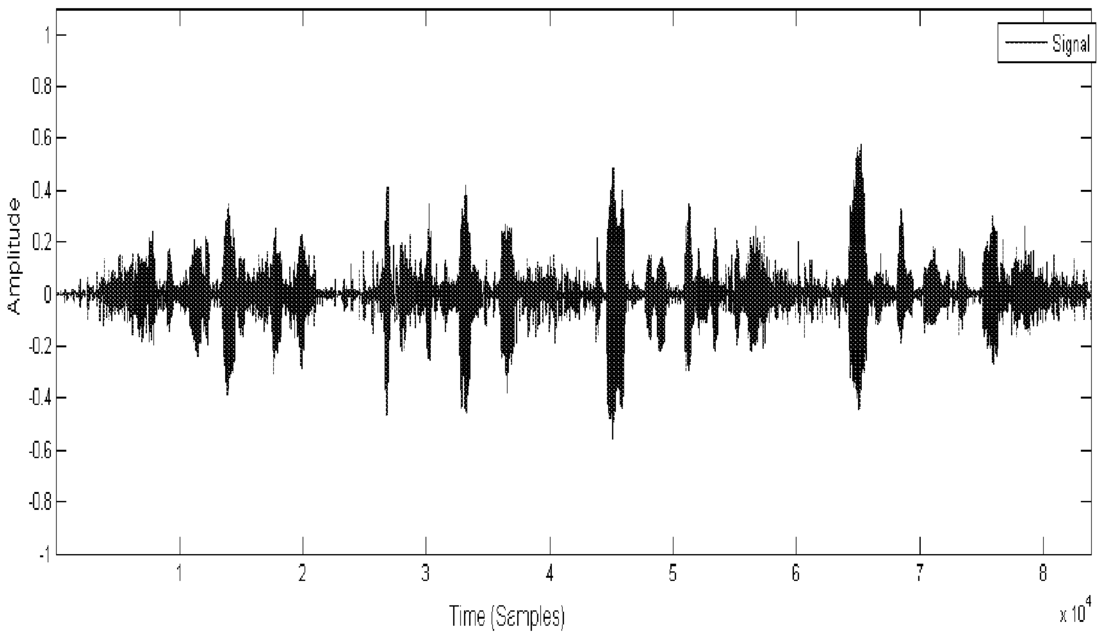
FIG. 4*a* is a diagram of a speech file corrupted with wind noise.

FIG. 4*a* is a diagram of a speech file corrupted with wind noise. The horizontal axis shows time (number of samples) and the vertical axis shows the amplitude of the signal.

Figure 4B:
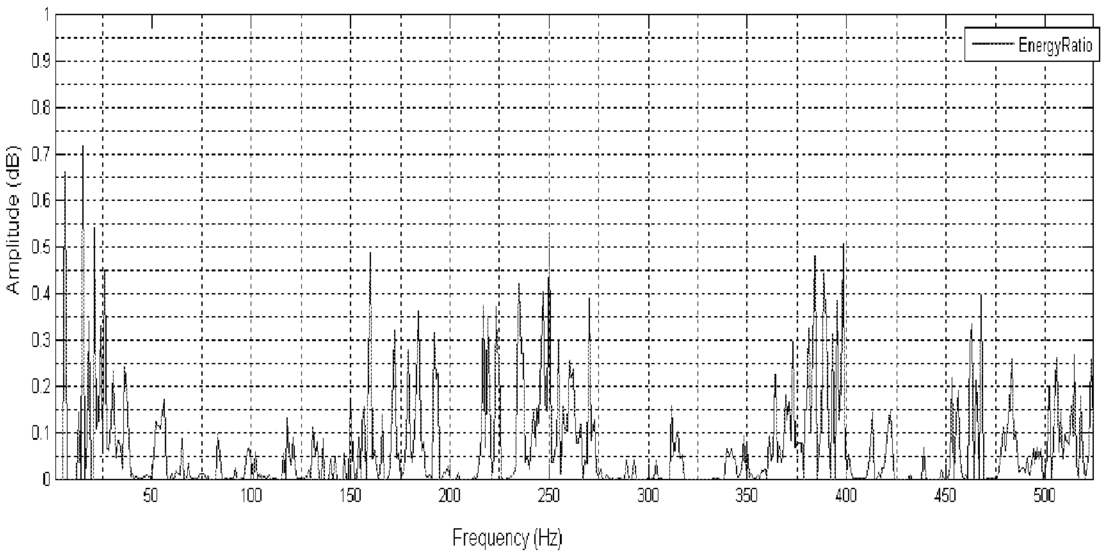
FIG. 4*b* is a diagram of the ratio of low frequency energy to the total frequency energy for the signal as described in FIG. 4*a*.

FIG. 4*b* is a diagram of the ratio of low frequency energy to the total frequency energy for the signal as described in FIG. 4*a*. The low frequency energy is typically calculated for frequencies less than 150 Hz. When there is speech, the low frequency energy is low. Hence the energy ratio is also low. When there is only noise and no speech, the low frequency energy is high. Hence the energy ratio is high. If the energy ratio exceeds a pre-defined threshold for more than duration of 'N' seconds, it is classified as wind noise. Otherwise, it is classified as other noises. The horizontal axis shows the frequency (Hertz) and the vertical axis shows the amplitude in dB.

Figure 5A:
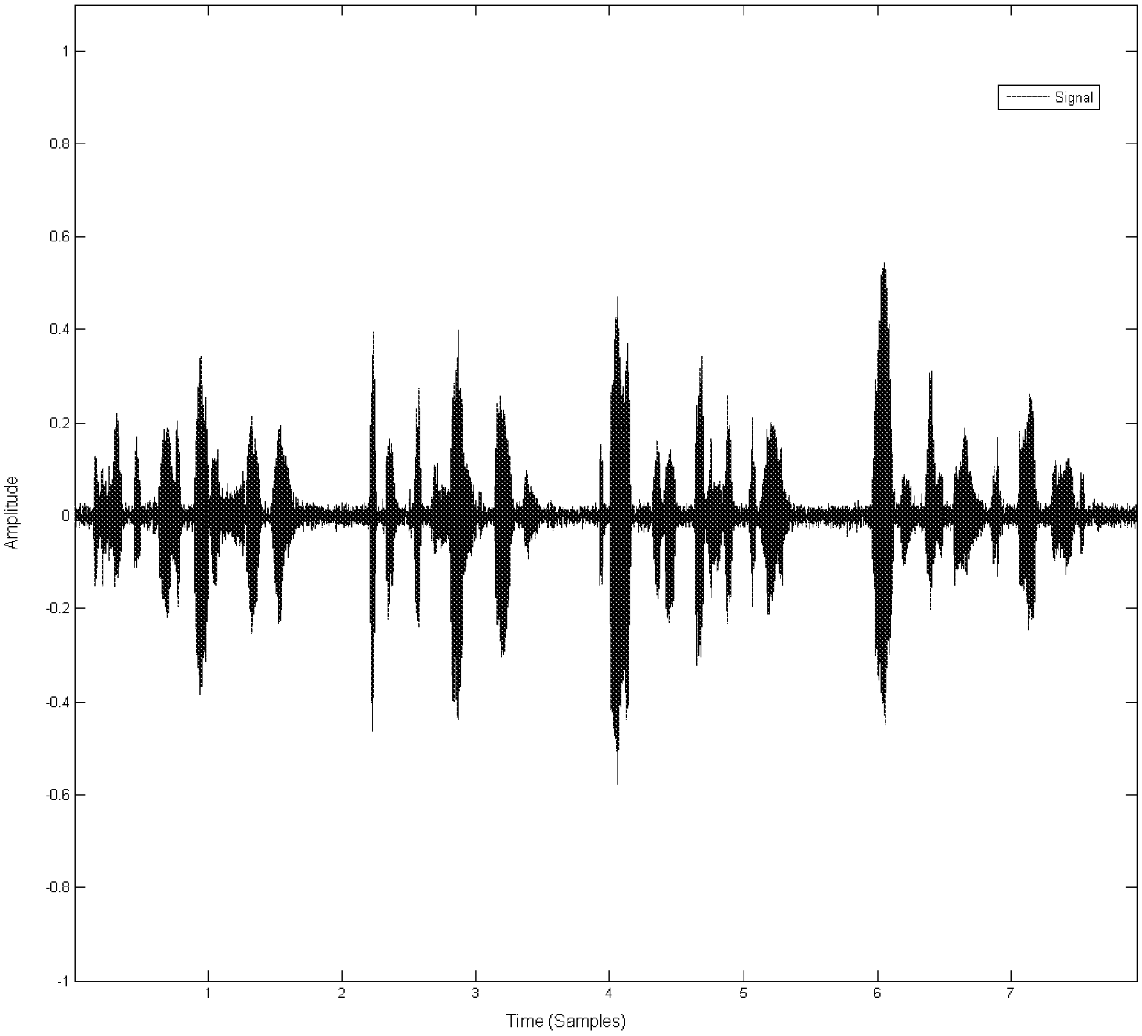
FIG. 5*a* is a diagram of a speech file corrupted with street noise.

FIG. 5*a* is a diagram of a speech file corrupted with street noise. The horizontal axis shows time (number of samples) and the vertical axis shows the amplitude of the signal.

Figure 5B:
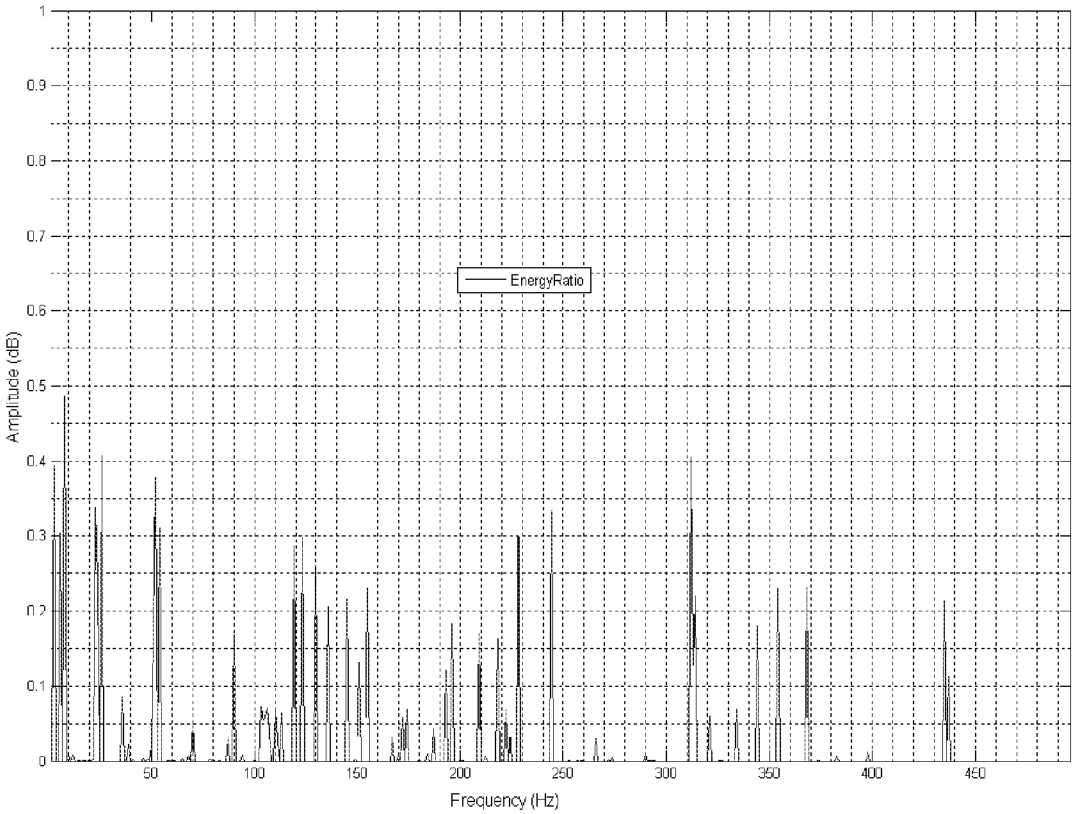
FIG. 5*b* is a diagram of the ratio of low frequency energy to the total frequency energy for the signal as described in FIG. 5*a*.

FIG. 5*b* is a diagram of the ratio of low frequency energy to the total frequency energy for the signal as described in FIG. 5*a*. A suitable threshold, based on different windy conditions, is chosen to classify the incoming noisy signal as windy or not. The horizontal axis shows the frequency (Hertz) and the vertical axis shows the amplitude in dB.

Figure 6A:
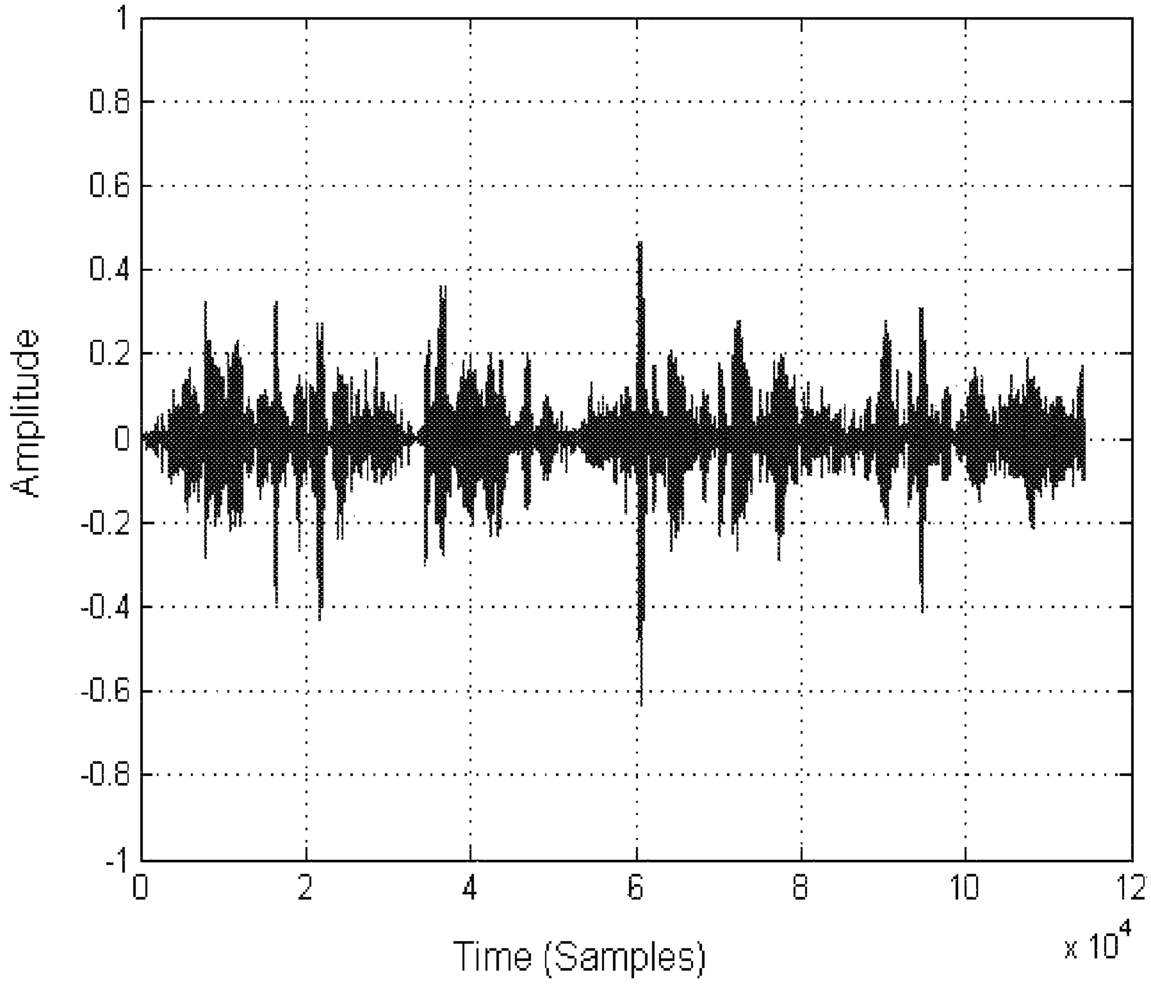
FIG. 6*a* is a diagram of a noisy file before processing where wind noise interferes with speech.

FIG. 6*a* is a diagram of a noisy file before processing where wind noise interferes with speech. The horizontal axis shows time (number of samples) and the vertical axis shows the amplitude of the signal.

Figure 6B:
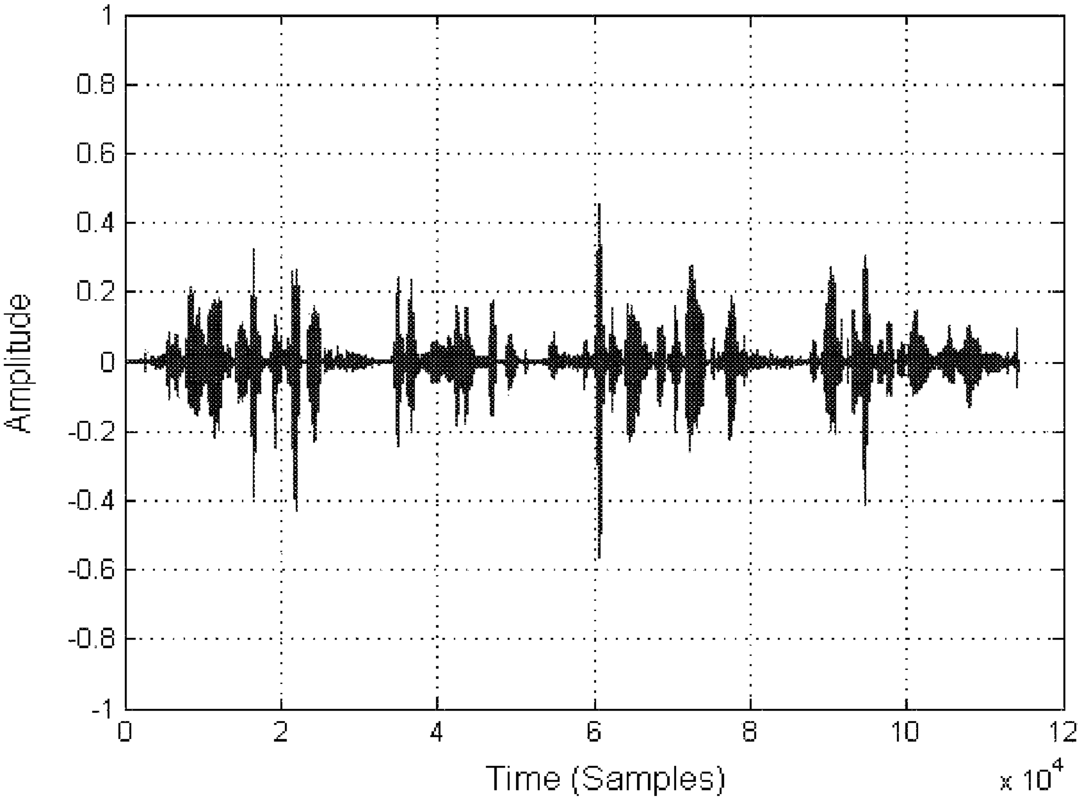
FIG. 6*b* is a diagram of a same file after processing using the wind noise reduction technology discussed in the current invention.

FIG. 6*b* is a diagram of a same file after processing using the wind noise reduction technology. The horizontal axis shows time (number of samples) and the vertical axis shows the amplitude of the signal.

As described hereinabove, the invention has the advantages of improving the signal-to-noise ratio by reducing noise in various noisy conditions, enabling the conversation to be pleasant. While the invention has been described with reference to a detailed example of the preferred embodiment thereof, it is understood that variations and modifications thereof may be made without departing from the true spirit and scope of the invention. Therefore, it should be understood that the true spirit and the scope of the invention are not limited by the above embodiment, but defined by the appended claims and equivalents thereof.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

The invention includes, but is not limited to the following items:

Item 1. A machine to improve the Signal to Noise Ratio to obtain enhanced speech signal within communication devices operating in noisy environments and communicating the enhanced speech signal over a voice communication link, the machine comprising means of:

a) measuring a windowed speech signal and a noise signal, wherein the speech signal may be represented as s(k) and the noise signal may be represented as n(k) and wherein the sum of the two may be denoted by x(k), wherein x(k)=s(k)+n(k) the latter being labeled as equation (1);

b) taking the Fast Fourier Transform (FFT) of both sides of equation (1) yielding: $X(e^{jw})=S(e^{jw})+N(e^{jw})$ which is labeled as equation (2) and $$x(k)\overset{FFT}{\longleftrightarrow}X(e^{jw})$$

which is labeled as equation (3);

c) considering the Fast Fourier Transform as an input signal;

d) measuring the input signal for low frequency energy ($E_{LF}$) and for total energy labeled ($E_{TOT}$), wherein the low frequency energy ($E_{LF}$) is calculated for frequencies less than 150 Hz, and wherein the total energy ($E_{TOT}$) is calculated for all frequencies present in the signal;

e) finding the ratio of $E_{LF}$ and $E_{TOT}$, wherein the result is labeled $E_R$;

f) labeling the exponential average of the $E_R$ as $E_{R\_AVG}$; wherein: $E_{R\_AVG}=\alpha(E_{R\_AVG})+(1-\alpha)E_R$ and is labeled as equation (4), and wherein the value of $\alpha$ is in the range of 0.75 to 0.95;

g) if the $E_{R\_AVG}$ is greater than the threshold value selected within the range of 0.30 to 0.40 wind noise is deemed to be present, otherwise wind noise is deemed to be absent;

h) when wind noise is deemed to be present, the magnitude of the noise spectrum $|N(e^{j\omega})|$ is replaced by its average value $\mu(e^{jw})$ measured during regions estimated as noise only, such that $\mu(e^{jw})=E\{|N(e^{jw})|\}$ and is labeled as equation (5), again the average equation is used with a similar range of values for $\alpha$;

i) calculating a power spectral density of the signal by subtracting a current noise estimator from a noisy observation by: $\hat{S}(e^{jw})=X(e^{jw})-\mu(e^{jw})$ and is labeled as equation (6), where $\mu(e^{jw})$ is the average value of the noise spectrum;

j) using equations (5) and (6) to calculate the Signal to Noise Ratio (SNR) per channel, the SNR per channel is obtained by dividing equation (6) with equation (5) and is given as $$\frac{\hat{S}(ejw)}{\mu(ejw)},$$

and is labeled as a_prior_SNR[band]. The gains are linear estimators based on the a_prior_SNR[band], wherein the gain estimators are given by gain[band]=K*a_priori_SNR [band]+LIMITER, labeled as equation (7) where K and LIMITER are constants obtained by maximizing Signal to Noise Ratio Improvement (SNRI) over a database of a plurality of speakers and noises, wherein the LIMITER value controls the amount of noise left versus speech distortion level; and k) expanding the calculated gains to cover plurality of FFT bins, the resulting FFT gains are then multiplied by N FFT bins to obtain a corrected signal, wherein N can be 256 or 512, and wherein the corrected signal is enhanced speech signal, and wherein the corrected signal is transmitted from the communication device over the voice communication link.

2. The machine of item 1, wherein gains per bin are calculated in place of gains per band, the resulting gains are then multiplied by N FFT bins to obtain a corrected signal, wherein N can be 256 or 512.

Item 3. A method for attenuating or cancelling undesired wind noise, the method comprising:

a) measuring a windowed speech signal and a noise signal, wherein the speech signal may be represented as s(k) and the noise signal may be represented as n(k) and wherein the sum of the two may be denoted by x(k), wherein x(k)=s(k)+n(k) the latter being labeled as equation (1);

b) taking the Fast Fourier Transform (FFT) of both sides of equation (1) yielding: $X(e^{jw})=S(e^{jw})+N(e^{jw})$ and is equation (2) and $$X(k)\overset{FFT}{\longleftrightarrow}X(e^{jw})$$

and is equation (3)

c) the Fast Fourier Transform is considered as an input signal;

d) the input signal is measured for low frequency energy ($E_{LF}$) and is measured for total energy ($E_{TOT}$);

e) the ratio of $E_{LF}$ and $E_{TOT}$ is found by dividing $E_{LF}$ by $E_{TOT}$ the result of which is labeled $E_R$;

f) the exponential average of the $E_R$ is labeled as $E_{R\_AVG}$ and is: $E_{R\_AVG}=\alpha(E_{R\_AVG})+(1-\alpha)E_R$ and is equation (4) and wherein the value of $\alpha$ is in the range of 0.75 to 0.95;

g) if the $E_{R\_AVG}$ is greater than the threshold value selected within the range of 0.30 to 0.40 the signal is deemed to be a wind.

h) an estimate of the wind noise spectrum is then found by replacing the magnitude |N(ejω)| of N(ejω) by its average value μ(ejω) measured during regions estimated as noise only, such that $$\mu(e^{jw})=E\{|N(e^{jw})|\}$$

i) a power spectral density of the signal is then calculated by subtracting a current noise estimator from a noisy observation by: $\hat{S}(e^{jw})=X(e^{jw})-\mu(e^{jw})$ where $\mu(e^{jw})$ is the average value of the noise spectrum j) the signal to noise ratio (SNR) per channel is computed by subtracting the average noise power estimator from the power spectral density of a current frame, gain estimations are found by: gain[band]=K*a_priori_SNR[band]+Limiter, where K and Limiter are constants obtained by maximizing Signal to Noise Ration Improvement (SNRI) over a database of a plurality of speakers and noises;

k) the calculated gains are then expanded to cover plurality of FFT bins; the resulting FFT gains are then multiplied by N FFT bins to obtain a corrected signal, N can be 256 or 512.

Item 4. The method of Item 3 wherein gains per bin is calculated in place of gains per channel.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

What is claimed is:

1. A machine to improve the Signal to Noise Ratio to obtain enhanced speech signal within communication devices operating in noisy environments and communicating the enhanced speech signal over a voice communication link, the machine comprising: a processor for;

a) measuring a windowed speech signal and a noise signal, wherein the speech signal may be represented as s(k) and the noise signal may be represented as n(k) and wherein the sum of the two may be denoted by x(k), wherein x(k)=s(k)+n(k) the latter being labeled as equation (1);

b) calculating the Fast Fourier Transform (FFT) of both sides of equation (1) yielding: $X(e^{jw})=S(e^{jw})+N(e^{jw})$ which is labeled as equation (2) and $$x(k) \overset{FFT}{\longleftrightarrow} X(e^{jw})$$

which is labeled as equation (3);

c) considering the Fast Fourier Transform as an input signal;

d) measuring the input signal for low frequency energy ($E_{LF}$) and for total energy labeled ($E_{TOT}$), wherein the low frequency energy ($E_{LF}$) is calculated for frequencies less than 150 Hz, and wherein the total energy ($E_{TOT}$) is calculated for all frequencies present in the signal;

e) calculating the ratio of $E_{LF}$ and $E_{TOT}$, wherein the result is labeled $E_R$;

f) labeling the exponential average of the $E_R$ as $E_{R\_AVG}$; wherein: $E_{R\_AVG}=\alpha(E_{R\_AVG})+(1-\alpha)E_R$ and is labeled as equation (4), and wherein the value of $\alpha$ is in the range of 0.75 to 0.95;

g) if the $E_{R\_AVG}$ is greater than the threshold value selected within the range of 0.30 to 0.40 wind noise is deemed to be present, otherwise wind noise is deemed to be absent;

h) when wind noise is deemed to be present, the magnitude of the noise spectrum $|N(e^{j\omega})|$ is replaced by its average value $\mu(e^{jw})$ measured during regions estimated as noise only, such that $\mu(e^{jw})=E\{|N(e^{jw})|\}$ and is labeled as equation (5), again the average equation is used with a similar range of values for $\alpha$;

i) calculating a power spectral density of the signal by subtracting a current noise estimator from a noisy observation by: $\hat{S}(e^{jw})=X(e^{jw})-\mu(e^{jw})$ and is labeled as equation (6), where $\mu(e^{jw})$ is the average value of the noise spectrum;

j) using equations (5) and (6) to calculate the Signal to Noise Ratio (SNR) per channel, the SNR per channel is obtained by dividing equation (6) with equation (5) and is given as $$\frac{\hat{S}(ejw)}{\mu(ejw)},$$

and is labeled as a_prior_SNR[band], calculating gains which are linear estimators that are based on the a_prior_SNR [band], wherein gain estimators are given by gain[band]= K*a_priori_SNR[band]+LIMITER, labeled as equation (7) where K and LIMITER are constants obtained by maximizing Signal to Noise Ratio Improvement (SNRI) over a database of a plurality of speakers and noises, wherein the LIMITER value controls the amount of noise left versus speech distortion level; and k) expanding the calculated gains to cover a plurality of FFT bins, wherein the resulting FFT gains are then multiplied by N FFT bins to obtain a corrected signal, wherein N can be 256 or 512, and wherein the corrected signal is enhanced speech signal, and wherein the corrected signal is transmitted from the communication device over the voice communication link.

2. The machine of claim 1, wherein gains per bin are calculated in place of gains per band, and the resulting gains are then multiplied by N FFT bins to obtain a corrected signal, wherein N can be 256 or 512.

* * * * *